United States Patent [19]

Levine

[11] 4,225,866
[45] Sep. 30, 1980

[54] AUTOMATIC FAILURE-RESISTANT RADAR TRANSMITTER

[75] Inventor: Arnold M. Levine, Chatsworth, Calif.

[73] Assignee: International Telephone and Telegraph Corporation, New York, N.Y.

[21] Appl. No.: 955,349

[22] Filed: Oct. 27, 1978

[51] Int. Cl.³ .............................................. G01S 7/40
[52] U.S. Cl. ............................ 343/17.7; 343/17.1 PW
[58] Field of Search ....................... 343/17.7, 17.1 PW

[56] References Cited

U.S. PATENT DOCUMENTS

| 3,199,107 | 8/1965 | Mills | 343/17.7 |
| 3,295,130 | 12/1966 | Prestwood | 343/17.7 |
| 3,452,353 | 6/1969 | Neuendorf | 343/17.1 PW X |
| 3,795,910 | 3/1974 | Robinson, Jr. | 343/17.7 X |
| 4,066,965 | 1/1978 | Schultz et al. | 343/17.7 X |

OTHER PUBLICATIONS

"A New-N-Way Power Divider/Combiner Suitable for High Power Applications" by Ulrik Gysel, IEEE-MTT-5 International Symposium Digest, pp. 116-118, 1975.

*Primary Examiner*—Malcolm F. Hubler
*Attorney, Agent, or Firm*—William T. O'Neil

[57] ABSTRACT

Apparatus is shown for controlling pulse width in pulsed, step-wise frequency modulated transmitters employing relatively long pulse widths and receiving pulse compression. Also disclosed is a pulsed pseudorandom coded radar system having fixed code word duration. Individual solid-state, RF power amplifier modules are paralleled, all spares included, and the full parallel group is operated at a power level such that individual units operate substantially below maximum power rating. RF solid-state device life is thereby increased. Failures of individual solid-state modules are recognized by a power monitor which operates to lengthen the pulse width in the FM staircase embodiment and to increase power supply input and, therefore, peak pulse power in the pseudo-random coded embodiment, thereby restoring average nominal transmitter power, notwithstanding one or more failed solid-state RF amplifiers.

4 Claims, 3 Drawing Figures

AUTOMATIC FAILURE-RESISTANT RADAR TRANSMITTER

BACKGROUND OF THE INVENTION

1. Field of the Invention

The invention relates to radar transmitters generally and more particularly to unattended or minimally attended radar transmitters employing a plurality of solid-state, radio frequency, power modules paralleled in failure resistant networks.

2. DESCRIPTION OF THE PRIOR ART

In the prior art the need for reliable unattended or minimally attended radar systems generates the requirement for fault tolerant transmitters. In typical current state-of-the-art radar transmitters, a single high-power RF generating device such as a magnetron, amplitron, or the like is controlled to generate the required train of radio frequency pulses. Quite obviously, failure of this single RF generating element causes failure of the entire system.

It has been recognized that, if the RF pulse transmitter comprised a number of solid-state RF amplifiers (for example) in a paralleled arrangement, these could be interconnected or paralleled in a network permitting the remaining units to continue to provide power output. Such a device was described by Ulrick Gysel in a Stanford Research Institute paper entitled "A New N-Way Power Divider/Combiner Suitable for High Power Applications". That paper was published in the IEEE-MTT-5International Symposium Digest, Page 116 (1975). The described device has since been referred to as Gysel combiner and is an improvement over the so-called Wilkinson combiner. The Wilkinson combiner was itself described in a paper entitled "An N-Way Hybrid Power Divider" published in the IRE Transactions on Microwave Theory and Technique, Volume MTT-8, pages 116–118 (January 1960). Further background information for those skilled in this art is contained in a paper by J. J. Taub and B. Fitzgerald entitled "A Note on N-Way Hybrid Power Dividers" published in the IEE Transactions on Microwave Theory and Techniques, Volume MTT-12, pages 260–261 (March 1964).

Since Microwave solid-state amplifier devices are currently limited to relatively low power per unit as compared to a magnetron, amplitron, etc., the paralleling of such devices in a network such as Gysel combiner was a natural outgrowth. The inherent reliability and long life of solid-state devices is particularly advantageous in the unattended or minimally attended radar application.

Various techniques have been proposed for employing paralleled RF solid-state devices. Most of these are based on some component switching mechanism for replacing failed power transistors to maintain the nominal transmitted power level. Such arrangements including spares which normally do not operate but are brought into action by these switching mechanisms to replace failed units.

Those of skill in this art are well informed on the prior art respecting pulse-compression radar and the reasons therefor. The text "Radar Handbook" by Merrill I. Sknoik (McGraw Hill Book Company 1970) devotes its Chapter 20 to the subject of "Pulse Compression Radar" and the reader desiring further background information in that respect can obtain it therefrom, and from the footnote references therein provided.

The manner in which the present invention provides an improved fault-tolerant or failed-resistant radar transmitter combination will be evident as this description proceeds.

SUMMARY

It may be said to have been the general objective of the present invention to provide an improved fault-tolerant, solid-state radar transmitter for the use in pulse-compression radar systems. The resulting reliability is substantially greater than achieved by prior art transmitters involving switching of individual solid-state transmitting units within the paralleled combination. The structure and operation of the invention involves the active paralleling of all solid-state units including spares, using a Gysel combiner and by reducing power applied to each unit, the overall nominal power being maintained at an initial predetermined level. In the FM pulse-compression embodiment, the pulse duration is shortened at the outset, the solid-state units thereby being operated substantially below their rated power handling capability. Failures of individual solid-state units, when these occur, produce a measurable drop in output power which is sensed by a power monitor, which controls a feedback loop to lengthen the transmitted pulse to restore the overall output power to the predetermined level. The individual solid-state units, of course, operate at higher power levels, but since they have been operating substantially below their power capability initially, this pulse lengthening may be thought of as employment of the reserve power handling capability or a portion of it.

Another form of pulse-compression radar is the so-called pseudo-random coded or pseudo-noise systems in which a pulse group or word of short successive phase-coded pulses is transmitted. Receiving pulse compression is effected by correlation of the received phase-coded pulse group against a sample of the transmitted waveform. In addition to background description of such systems in the aforementioned Radar Handbook, the text "Modern Radar" by Raymond S. Berkowitz (John Wiley and Sons 1965) devotes its Chapter 4 to pseudo-random binary coded waveforms. That text provides additional concise background information for such systems.

The details of a pulsed FM (chirp) system and also of a pseudo-random coded (PRC) system employing the concept of the present invention will be understood as this description proceeds. Unlike the pulsed frequency-modulated embodiment, lengthening of the pulse duration is not employed to restore overall output power after the failure of a solid-state unit, but in the pseudo-random coded embodiment, amplitude is increased to compensate average power similarly. In the PRC embodiment the pulse envelope duration is fixed by the particular code word employed.

DESCRIPTION OF THE PREFERRED EMBODIMENT

Figure 1:
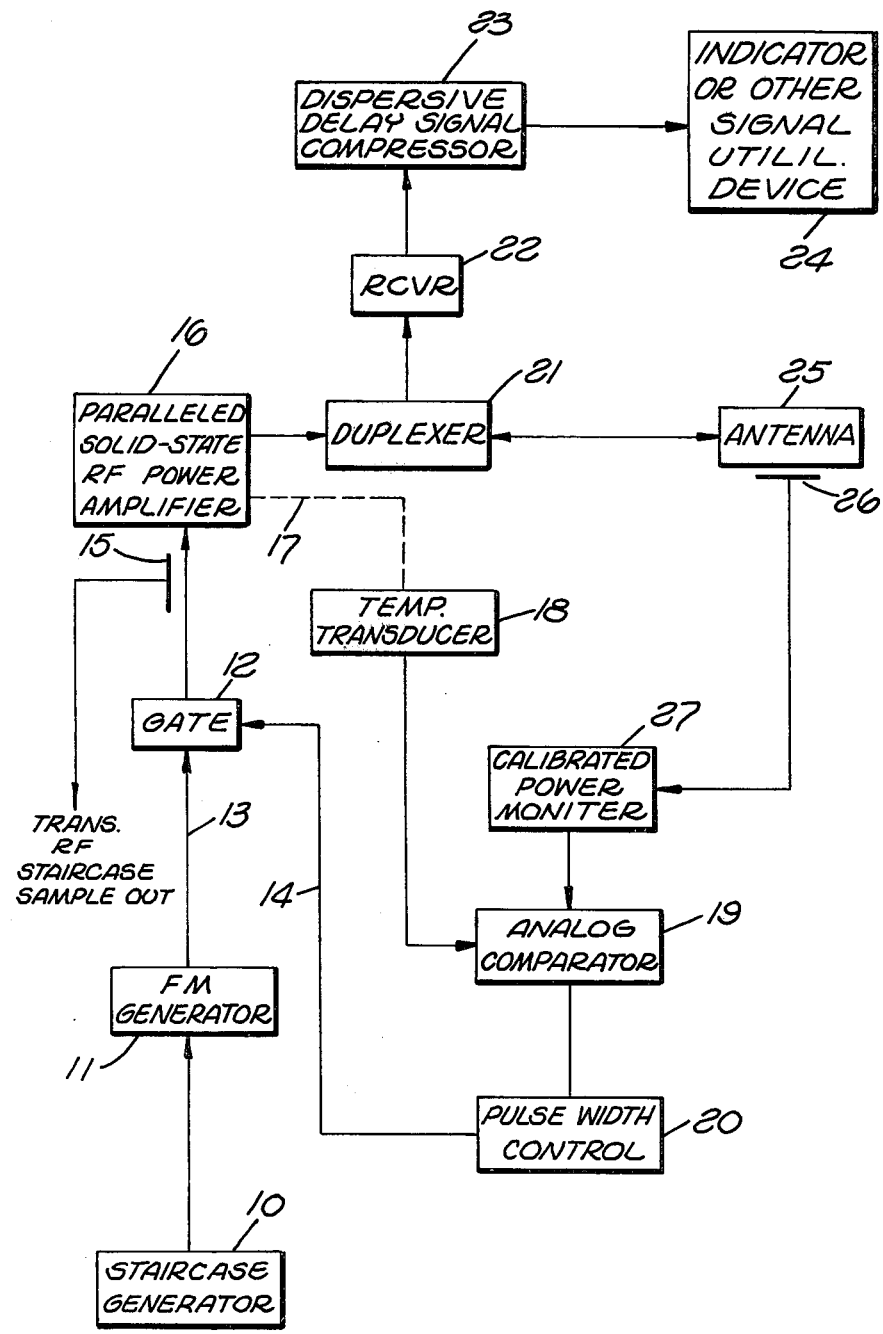
FIG. 1 is a block diagram of a pulse-compression radar employing the invention in a frequency modulated (chirp) format.

Referring now to FIG. 1, the pulsed FM (chirp) embodiment will be described. Although chirp pulse transmitters have commonly been instrumented with linear or stairstep frequency variation over the pulse, the invention will be described with respect to a staircase frequency variation according to the frequency function illustrated in FIGS. 3(c) and 3(d). Such an approach provides stairstep frequency variations approximating a linear ramp, the stairstep version being more readily instrumented digitally.

Figure 3:
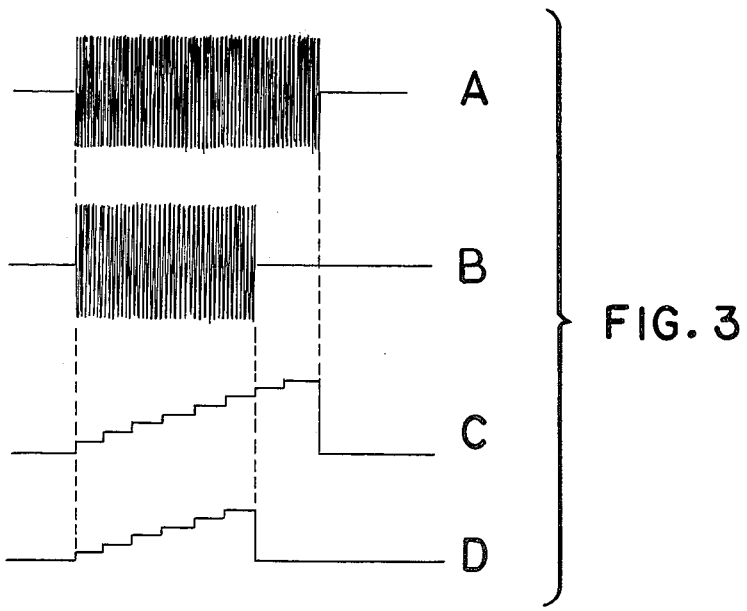
FIG. 3(a) and 3(b) depict lengthened pulse transmissions and original pulse transmission durations, respectively, for the embodiment of FIG. 1.
FIGS. 3(c) and 3(d) depict the typical stairstep FM pulses corresponding to FIGS. 3(a) and 3(b) respectively.

The staircase generator 10 is a "video domain" generator for producing the waveform of FIG. 3(c), the waveform it outputs to the FM generator 11 being the maximum length comtemplated for the particular design. In the FM generator 11, the initial RF signal is varied in frequency in accordance with FIG. 3(c) so that at lead 13 FIG. 3(c) becomes a plot of frequency (ordinate) vs. time (as the abscissa) of the waveform. The gate 12, being controlled by a signal on lead 14 produces the waveform 3(d) an integral number of steps of the staircase in duration. This is readily possible with digital instrumentation synchronous with the staircase generator 10. The pulse width control 20 thus would supply a gating signal of corresponding duration, this mechanism being described in more detail hereinafter.

At this point it should be realized that the number of staircase steps illustrated in FIGS. 3(c) and 3(d) is illustrative only and that many more discrete frequency steps might be involved than are depicted for explanatory purposes. That is to say, a good approximation of the linear FM ramp can be achieved by using a relatively large number of such discrete steps.

The RF output from gate 12 is fed to the RF power amplifier 16 comprising the paralleled solid-state RF units, and on the way a small signal fraction is coupled out by a coupler 15 to lead 15(a). That same signal is injected at 15(b) into the receiver 22, this providing for ranging determinations, especially vernier range determinations as is known in connection with common prior art pulsed FM compressive receivers.

The RF output of 16 is of course greatly boosted in power level, the signal it supplies to antenna 25 through duplexer 21 being the output transmitted power. Received echo signals at antenna 25 are passed through duplexer 21 to receiver 22 in a well known way, and thereafter are supplied to the dispersive delay signal compressor 23. This compressor 23 may be no more than a dispersive delay line, i.e., a delay line which provides a pulse delay which is a function of signal frequency. Accordingly, an output from receiver 22 in the IF domain is appropriately supplied to 23, the received energy therein being compressed into a considerably smaller duration signal pulse and reduced to the video domain after which it is supplied to the indicator or other signal utilization device 24. As hereinbefore indicated the technique and structure for this compression is well known in the prior art.

A sample of the transmitted power having an amplitude proportional thereto is taken at coupler 26 and fed to a power monitor 27 which has an output directly analogous to the power output at antenna 25. Analog comparator 19 is to be understood to contain a reference against which the output of 27 is compared to provide an output signal capable of directly controlling the pulse width unit 20. The comparator 19 preferably also includes a nominal amount of gain to enhance the functioning of the control loop comprising the RF power amplifier 16, the power monitor 27 (through duplexer 21 and antenna 25), the comparator 19, the pulse width control 20 and the gate 12.

It is to be assumed that the initial pulse width dictated by 20 has a duration equal to the RF envelope at FIG. 3(b) and the staircase waveform 3(d).

As long as there is no failure of any of the paralleled solid-state units in 16, the signal relationships throughout the aforementioned control loop remain static and in balance. However, if a failure does occur the decrease of the power sample coupled out at 26 is immediately recognized by 27 and comparator 19 so that the pulse width control unit 20 is commanded to increase the duration of its gating signal on 14. As previously indicated this control is in even step increments of the staircase waveform. The RF envelope duration at the output of gate 12 resulting from readjustment due to such a failure is typically represented at FIG. 3(a), this corresponding to a nominal number of staircase steps added as evident in FIG. 3(c) as compared to FIG. 3(d). Ordinarily there is no requirement for exceedingly rapid response in the control loop just described. Adjustment in a fraction of a second is readily achieved with stable circuitry. In the digital instrumentation suggested, each step of FIGS. 3(c) and 3(d) might represent some predetermined integral number of system clock pulses.

The instrumentation of individual blocks of FIG. 1 will be evident to those skilled in this art. From the aforementioned prior art technical paper describing the Gysel combiner, those of skill in this art will be readily able to implement the parallel solid-state device RF power amplifier 16 with any appropriate number of solid-state units or modules. While practical RF power combiners do not eliminate the loading effect of failed units, the loading can be limited to manageable proportions if the number of failed units is not large.

A temperature transducer 18 in tight thermal association with a heat sink associated with the solid-state units in 16 generates a limiting signal in response to excessive heating to prevent lengthening of the transmitted pulse beyond the capability of the RF units remaining after a failure.

Figure 2:
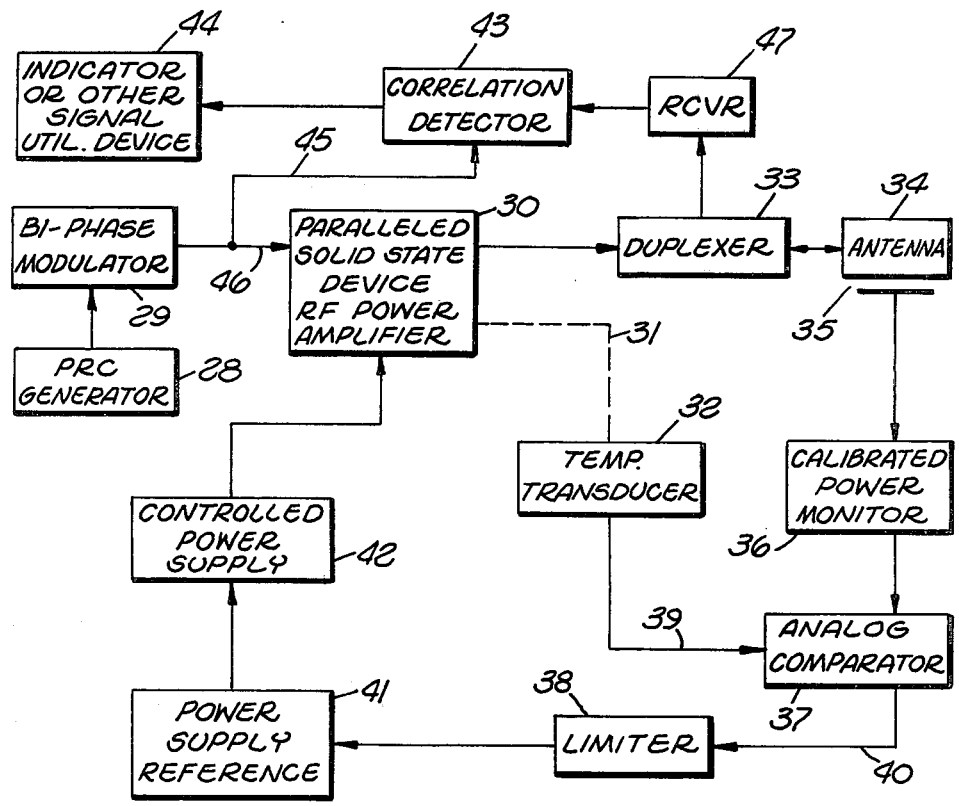
FIG. 2 is a pseudo-random coded radar employing the invention.

Referring now to FIG. 2, a pseudo-random-coded radar system is depicted. The invention as applied to FIG. 2 utilizes the same broad concept as applies to FIG. 1, namely that the predetermined or initial level of output power from the transmitter is adjusted upward to compensate for failed units in the plural paralleled solid-state devices of an RF amplifier. Accordingly, each of these paralleled solid-state units assumes a somewhat increased share of the total power, however, initially the units are operated substantially below their maximum or rated power capability. Accordingly, a power margin is available.

In the configuration of FIG. 2, it is not possible to lengthen the pulse envelope since this is basically fixed by the length of the code word employed. As has been previously indicated, the configuration of FIG. 2 is based on the generation of a PRC (pseudo-random code) word in generator 28, this being applied to a bi-phase modulator 29 and fed by lead 46 to the parallel solid-state device 30 which is to be understood to be instrumented using (for example) a Gysel combiner substantially the same as was the case with the embodiment of FIG. 1. The output of this transmitter power amplifier 30 is essentially the full output power of the system and is conveyed to the antenna 34 through a duplexer 33 for transmission. Received signals into the antenna 34 pass through the duplexer 33 and into a receiver 47 and they are then correlated in a correlation detector 43 against a sample of the bi-phase modulated transmittable signal (at low power level) supplied on lead 45 to correlation detector 43. That part of the configuration in FIG. 2 is completely standard and prior art and is readily understood from the prior art references hereinbefore mentioned for an understanding of typical, known pseudo-random bi-phase coded compressive radar system. Furthermore, an indicator or other signal utilization device 44 may be substantially the same as 24 of FIG. 1. Of course, in either FIG. 1 or FIG. 2, the utilization device might actually be some type of further signal processing known of itself but not a part of the present invention.

Coupler 35 samples out a small fraction of the transmittable energy at antenna 34 in the same manner as coupler 26 did so in respect to antenna 25 in the embodiment of FIG. 1. The amplitude of this energy sample is to be understood to be proportional, albeit much lower in level, to the total transmittable power. The calibrated power monitor 36 and analog comparator 37 supply basically the same functions as was the case with counterparts 27 and 19 in FIG. 1. Accordingly, an output signal resulting from comparison of the power monitor determination 36 against a reference in 37 produces a signal of the opposite sense as compared to the reduced value of the output of 36 in the event of a failure of one or more of the solid state units in 30. Such a signal on 40 is intended to be compared to a power supply reference in block 41 and result in the increase in the power supply voltage from 42 to the RF power amplifier device 30.

Unlike the embodiment of FIG. 1, there is no change in the duration of the transmitted pulse envelope which is essentially the duration of the pseudo-random code word. The boosting of the power supply 42 output voltage does, however, have the effect of increasing the amplitude of the individual RF pulses supplied from 30, the antenna 34 through the duplexer 33. Basically, as previously indicated, the average power is thus returned to its initial or predetermined level prior to the failure of any of the solid-state units or modules in 30. It will be realized that, alternatively, the RF PRC envelopes could be amplitude modulated at or in connection with 29, such an arrangement having the same effect on RF power output as that achieved in the arrangement of FIG. 2.

A limiter 38 is included in the signal path 40 between the analog comparator 37 and power supply reference 41, but may equally well be provided between 41 and the control power supply 42. The purpose of this limiter is to avoid the excessive increase of power supply voltage which might result from a malfunction in the control circuitry or failure of a large fraction of the solid-state units of 30, with consequent damage to the remaining operative solid-state units in 30.

As in the configuration of FIG. 1, a temperature transducer 32 is thermally associated with the heat sink elements which would normally be provided for the solid-state units in 30. This temperature transducer like its counterpart 18 in FIG. 1 provides a signal on lead 39 to the analog comparator 37 in a sense to restrain or limit the increase of power applied from 42 in the event of some circuit malfunction, or the cumulator failure of a sufficient number of solid-state units in 30 such as to require power sharing of the remaining operative solid-state units beyond their capability. Such a power overload would result in excessive heating of those solid-state modules, an effect detected through the thermal connection 31 by the temperature transducer 32. Thus the signal on 39 may be thought of as a restraint applied, for example, only above a certain threshold to limit the power increases applied to 30.

It is well known that the increase of solid-state device life as a result of de-rating, i.e., operation substantially below their rated power capability, is substantial of itself. Accordingly, the initial predetermined power level is a key consideration in connection with the present invention.

While the pulse frequency versus time relationships depicted in FIGS. 3(c) and 3(d) would indicate increasing frequency with time, there is actually no reason why a compatible system could not be implemented based on declining frequency (negative slope) within each pulse.

It will be realized by those skilled in the art, that the circuits described can be adapted for the reduction of applied power rather than its increase to compensate for failed solid-state units after a certain number of those units have become inoperative. In that event, of course, the output power will fall below the predetermined or initial level, however, in some unattended situations such power loss can be preferable to total failure. Such a power loss is consistent with the invention in view of the fact that, for the first few failed solid-state units, the basic concept of the invention provides for maintenance of the predetermined initial power level as herein described.

Other modifications and variations will suggest themselves to those skilled in this art. Accordingly it is not intended that drawings of this description be regarded as limiting the scope of the invention, these being intended to being typical and illustrative only.

From an understanding of the principles of the invention, it will be understood that the concepts could be applied to a nonpulse compressive radar system, although the invention is particularly advantageous in connection with radar systems of the type described.

What is claimed is:

1. A failure resistant pulsed radar system transmitter of the FM chirp type comprising:
   first means having a radio frequency input and radio frequency power output and N substantially identical solid-state radio frequency amplifier units operating in parallel electrically and each contributing 1/N of the predetermined level of the total output power of said transmitter, said units each operating at a power level below its maximum rating;
   second means comprising apparatus for providing successive pulses of radio frequency energy for driving said first means, said second means varying the transmitted frequency throughout each of said successive pulses;
   third means responsive to said first means power output for developing a control signal as a function of said total output power, and for applying said control signal in a manner to maintain said total output power substantially at said predetermined level by modifying the duration of each of said successive pulses;

and fourth means within said first means for substantially isolating failed ones of said modules for limiting interaction with the remaining operative modules.

2. Apparatus according to claim 1 in which said means for varying the transmitted frequency within each of said pulses includes means for effecting said frequency variation in discrete steps approximating a linear variation.

3. Apparatus according to claim 2 in which said third means comprises circuits for monitoring said power output to develop an analog thereof and for developing said control signal by comparison of said analog to a reference, said control signal being applied to determine the duration of said transmitted pulses in integral numbers of said steps.

4. Apparatus according to claim 1 which a temperature transducer in included for sensing the operating temperature of said solid-state units to develop and apply a temperature derived signal to said third means to limit the duration of said transmitted pulses and therefore the power dissipation of said solid-state units.

* * * * *